United States Patent
Liu et al.

(10) Patent No.: US 11,061,803 B2
(45) Date of Patent: Jul. 13, 2021

(54) CHECKING SYSTEM, CHECKING METHOD AND COMPILING METHOD OF SYSTEM START-UP FILE

(71) Applicant: JRD COMMUNICATION (SHENZHEN) LTD, Guangdong (CN)

(72) Inventors: Xiangjun Liu, Guangdong (CN); Tiejun Deng, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 0 days.

(21) Appl. No.: 16/309,943

(22) PCT Filed: Oct. 10, 2017

(86) PCT No.: PCT/CN2017/105432
§ 371 (c)(1),
(2) Date: Dec. 14, 2018

(87) PCT Pub. No.: WO2018/090759
PCT Pub. Date: May 24, 2018

(65) Prior Publication Data
US 2019/0163606 A1 May 30, 2019

(30) Foreign Application Priority Data
Nov. 15, 2016 (CN) .......................... 201611025231.3

(51) Int. Cl.
*G06F 11/36* (2006.01)
*G06F 21/64* (2013.01)
(Continued)

(52) U.S. Cl.
CPC .......... *G06F 11/3608* (2013.01); *G06F 11/08* (2013.01); *G06F 11/1004* (2013.01); *G06F 21/575* (2013.01); *G06F 21/64* (2013.01)

(58) Field of Classification Search
CPC ...... G06F 11/08; G06F 11/1004; G06F 11/36; G06F 11/3604; G06F 11/3608; G06F 21/57–577; G06F 21/64
(Continued)

(56) References Cited

U.S. PATENT DOCUMENTS 8,317,607 B2 * 11/2012 Shimabukuro ....... G06F 21/575
463/29
9,003,194 B2 * 4/2015 Ross ...................... G06F 21/64
713/181
(Continued)

FOREIGN PATENT DOCUMENTS

| CN | 101807152 A | 8/2010 |
| CN | 103226505 A | 7/2013 |

(Continued)

OTHER PUBLICATIONS

Bashun, V., et al., Too Young to be Secure: Analysis of UEFI Threats and Vulnerabilities, 14th Conference of Open Innovation Association FRUCT, Nov. 11-15, 2013, pp. 16-24, [retrieved on Feb. 23, 21], Retrieved from the Internet: <URL:http://ieeexplore.ieee.org/>.*

(Continued)

*Primary Examiner* — Geoffrey R St Leger (57) ABSTRACT

The present disclosure provides a checking method of a system start-up file. The method includes: acquiring the system start-up file and a mapping table from a system firmware partition; reading first check data and addressing data associated therewith from the mapping table; reading segmentation data corresponding to the first check data from the system start-up file according to the addressing data; determining whether the first check data is a first type or a second type; if it is the first type, determining whether the segmentation data is a repeated permutation of the first check data, and if not, a security error exists in the system (Continued)

start-up file; and if it is the second type, determining whether second check data, obtained by calculating the segmentation data according to a check algorithm, is consistent with the first check data, and if inconsistent, a security error exists in the system start-up file.

5 Claims, 5 Drawing Sheets (51) Int. Cl.
*G06F 11/10* (2006.01)
*G06F 21/57* (2013.01)
*G06F 11/08* (2006.01)

(58) Field of Classification Search
USPC .................................................. 717/124, 126
See application file for complete search history.

(56) References Cited

U.S. PATENT DOCUMENTS

| 9,223,982 | B2* | 12/2015 | Adams | G06F 21/575 |
|---|---|---|---|---|
| 9,569,622 | B2* | 2/2017 | Dover | G06F 21/575 |
| 9,703,960 | B2* | 7/2017 | Hong | G06F 21/57 |
| 9,705,853 | B2* | 7/2017 | Vanore | H04W 4/50 |
| 10,318,726 | B2* | 6/2019 | Kota | G06F 11/108 |
| 2003/0066062 | A1 | 4/2003 | Brannock et al. | |
| 2010/0120529 | A1* | 5/2010 | Shimabukuro | G06F 21/575 463/29 |
| 2012/0041931 | A1* | 2/2012 | Ross | G06F 21/64 707/693 |
| 2013/0185484 | A1 | 7/2013 | Zhou | |
| 2014/0250291 | A1* | 9/2014 | Adams | G06F 21/575 713/2 |
| 2015/0124967 | A1* | 5/2015 | Vanore | H04L 9/14 380/270 |
| 2015/0249473 | A1 | 9/2015 | Li et al. | |
| 2015/0254458 | A1* | 9/2015 | Hong | G06F 21/57 726/22 |
| 2016/0147997 | A1* | 5/2016 | Dover | G06F 21/575 713/2 |
| 2017/0300251 | A1* | 10/2017 | Kota | G06F 3/0619 |
| 2018/0075241 | A1 | 3/2018 | Gomez et al. | |

FOREIGN PATENT DOCUMENTS

| CN | 103646082 A | 3/2014 |
|---|---|---|
| CN | 103729597 A | 4/2014 |
| CN | 103226505 B | 8/2016 |
| WO | 2016167801 A1 | 10/2016 |

OTHER PUBLICATIONS

Löhr, H., et al., Patterns for Secure Boot and Secure Storage in Computer Systems, 2010 International Conference on Availability, Reliability and Security, Feb. 15-18, 2010, pp. 569-573, [retrieved on Feb. 23, 21], Retrieved from the Internet: <URL:http://ieeexplore.ieee.org/>.*

Search Report of counterpart European Patent Application No. 17871657.7 dated Nov. 15, 2019.

Office action of counterpart European Patent Application No. 17871657.7 dated Oct. 2, 2020.

* cited by examiner

CHECKING SYSTEM, CHECKING METHOD AND COMPILING METHOD OF SYSTEM START-UP FILE

CROSS-REFERENCE TO RELATED APPLICATIONS

The present application is a 35 U.S.C. § 371 National Phase conversion of International (PCT) Patent Application No. PCT/CN2017/105432 filed Oct. 10, 2017, which claims foreign priority of Chinese Patent Application No. 201611025231.3, filed on Nov. 15, 2016 in the State Intellectual Property Office of China, the contents of all of which are hereby incorporated by reference.

TECHNICAL FIELD

The present disclosure relates to the field of computer technologies, and in particular, to a checking system of a system start-up file, a checking method of a system start-up file and a compiling method of a system start-up file.

BACKGROUND

With the maturity and popularity of electronic products, a growing number of people's attention is focused on system software of electronic products, especially mobile phone products. In order to prevent the mobile phone firmware from being modified or damaged, the current android system generates a check value by calculating the system firmware file, and attaches the check value to the end of the system firmware file. By reading the system firmware partition when the system starts, the system firmware file and the check value may be obtained for further verification.

However, the length of the system firmware file must be less than the length of the system firmware partition. In order to keep the length of the system firmware file consistent with the length of the system firmware partition, a large amount of padding data needs to be stored in the system firmware partition. The data may increase the time required for checking system firmware and increase the workload.

SUMMARY

The technical problem to be solved by the present disclosure is to provide a checking method and a compiling method of a system start-up file, which can reduce the check time of the system start-up file and improve work efficiency.

In order to solve the above-mentioned technical problem, a first aspect of the present disclosure provides a checking system of a system start-up file. The system includes a processor, and a storage coupled to the processor; the memory is configured to store a system firmware file, a mapping table, and instructions executed by the processor. The processor is configured to: acquire the system start-up file and the mapping table from a system firmware partition; read first check data and addressing data associated with the first check data from the mapping table; read segmentation data corresponding to the first check data from the system start-up file according to the addressing data; determine whether the first check data is a first type or a second type; determine whether the segmentation data is a repeated permutation of the first check data if the first check data is the first type, and when the segmentation data is not the repeated permutation of the first check data a security error exists in the system start-up file; and determine whether second check data, acquired through calculating the segmentation data according to a check algorithm, is consistent with the first check data if the first check data is the second type, and when the second check data is inconsistent with the first check data a security error exists in the system start-up file.

In order to solve the above-mentioned technical problem, a second aspect of the present disclosure provides a checking method of a system start-up file. The method includes: acquiring the system start-up file and a mapping table from the system firmware partition; reading first check data and addressing data associated with the first check data from the mapping table; reading segmentation data corresponding to the first check data from the system start-up file, according to the addressing data; determining whether the first check data is a first type or a second type; determining whether the segmentation data is a repeated permutation of the first check data if the first check data is the first type, and when the segmentation data is not the repeated permutation of the first check data a security error exists in the system start-up file; and determine whether second check data, acquired through calculating the segmentation data according to a check algorithm, is consistent with the first check data if the first check data is the second type, and when the second check data is inconsistent with the first check data a security error exists in the system start-up file.

Herein, the addressing data includes a starting address and a data length corresponding to the segmentation data.

Herein, the mapping table is provided with a data type identifier associated with the first check data, or the first check data of the first type and the first check data of the second type are separately stored in different mapping tables; the block of determining whether the first check data is the first type or the second type includes: determining whether the first check data is the first type or the second type, according to the data type identifier or the mapping table from which the first check data is derived.

Herein, the first check data of the first type and the first check data of the second type are continuously stored separately, and the first check data of the first type is set to be read prior to the first check data of the second type.

Herein, the check algorithm is a HASH algorithm.

In order to solve the above-mentioned technical problem, a third aspect of the present disclosure provides a compiling method of a system start-up file. The method includes: acquiring the system start-up file; determining whether the system start-up file includes first segmentation data formed by a repeated permutation of bytes or byte combinations; if the first segmentation data exists, associating the bytes or byte combination, regarded as check data, with addressing data of the first segmentation data and storing the check data in a mapping table; determining second segmentation data other than the first segmentation data; associating check data, obtained by the second segmentation data through a check algorithm, with addressing data of the second segmentation data, and storing the check data in the mapping table; and storing the mapping table together with the system start-up file into a preset system firmware partition.

Herein, the addressing data is a starting address and a data length corresponding to the first segmentation data or the second segmentation data.

Herein, the method further includes: with a data type identifier associated with the check data, separately marking the check data, obtained by the bytes or byte combination, and the check data, obtained through the check algorithm, into a first type and a second type, or separately storing the check data obtained by the bytes or byte combinations and the check data obtained by the check algorithm in different mapping tables.

Herein, the check data obtained by the bytes or byte combinations and the check data obtained by the check algorithm are continuously stored separately, and the check data obtained by the bytes or byte combinations is configured to be read prior to the check data obtained by the check algorithm.

Herein, the check algorithm is a HASH algorithm.

The present disclosure may have the advantages that reading the first check data of the system start-up file from the mapping table, and classifying the corresponding segmentation data in the system start-up file, during the check process, different types of segmentation data are checked according to different methods, thereby reducing verifying time of system start-up file, further improving work efficiency.

DETAILED DESCRIPTION

The technical solutions in the embodiments of the present disclosure will be clearly and completely described as follows with reference to the accompanying drawings in the embodiments of the present disclosure. It is obvious that the described embodiments are merely a part of the embodiments of the present disclosure, and not all of them. All other embodiments obtained by those skilled in the art based on the embodiments of the present disclosure without creative efforts shall all fall into the protection scope of the present disclosure.

Moreover, the terms "first", "second", and "third" are used for descriptive purposes only and shall not be construed as indicating or implying a relative importance or implicitly indicating the number of technical features indicated. Thus, features defining "first", "second", and "third" may include at least one of the features, either explicitly or implicitly.

Figure 1:
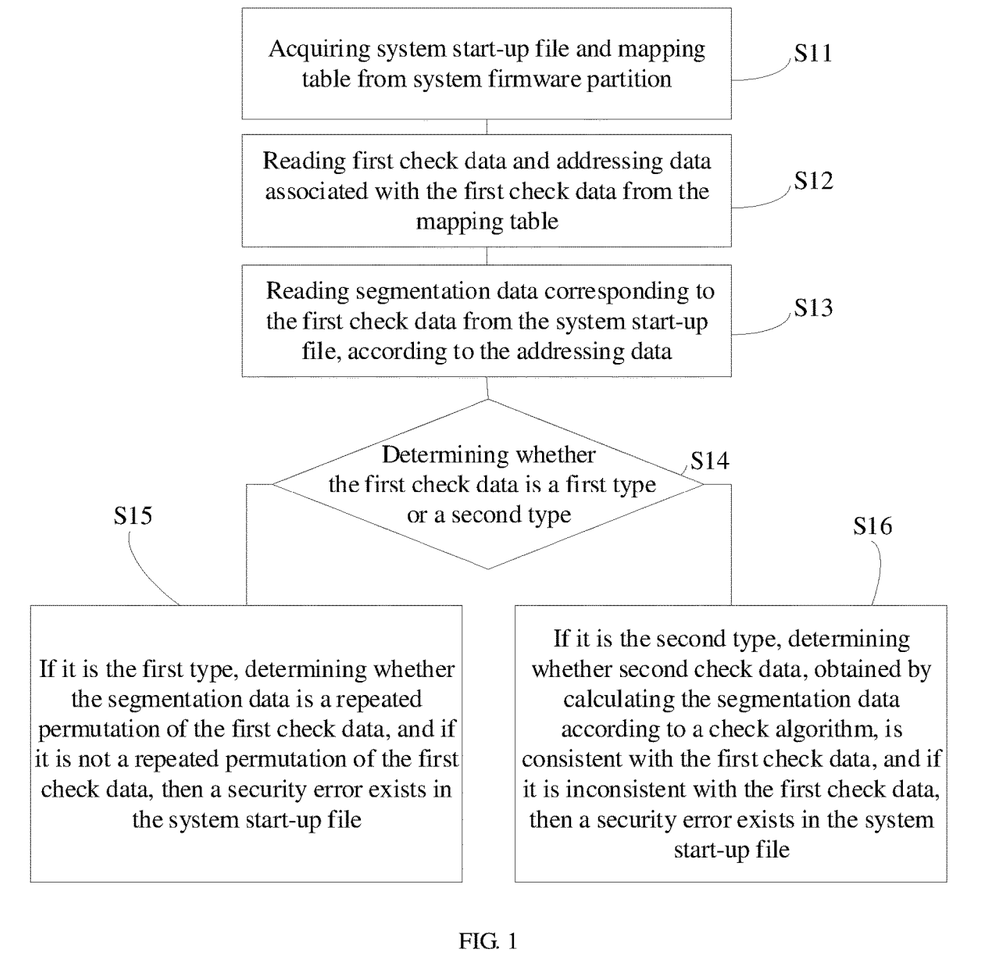
FIG. 1 is a schematic flow chart illustrating an embodiment of a checking method of a system start-up file according to the present disclosure.

FIG. 1 is a schematic flow chart illustrating an embodiment of a checking method for a system start-up file according to the present disclosure. It should be noted that the method of the present disclosure is not limited to the sequence of the flow shown in FIG. 1 if substantially the same result is obtained. As shown in FIG. 1, the method includes the following blocks.

In S11, the method includes acquiring a system start-up file and a mapping table from a system firmware partition.

The above system start-up file, i.e., a system firmware file, is the most basic and lowest level working software of the terminal. For independent terminal products, such as, smart phone, router or MP4, the system firmware usually refers to the operating system. For non-independent terminal products, such as, hard disk, optical drive or USB flash drive, the system firmware is the program code at the lowest level for supporting operations of the device. Therefore, before the user uses the terminal product, the system firmware has been written into the hardware system corresponding to the terminal product by other tools or software. When the terminal is powered on, the system hardware directly gets driven and invoked through the system firmware, so that the terminal works normally. The mapping table is configured to store data having a mapping relationship, and in a specific implementation, the mapping table is configured to store some data information related to the system firmware file.

In S12, the method includes reading first check data and addressing data associated with the first check data from the mapping table.

In this embodiment, the mapping table is configured to store first check data associated with the system firmware file and addressing data associated with the first check data. The addressing data includes a starting address of the data and a data length of the data.

In S13, the method includes reading segmentation data corresponding to the first check data from the system start-up file, according to the addressing data.

Since the addressing data is associated with the first check data, the system can read the segmentation data corresponding to the first check data from the system firmware file, according to the addressing data. For example, the addressing data includes the starting address of the data: Address=0, and the data length: Length=4096. By starting from address 0 of the system firmware partition, and reading the data with a length of 4096 into the buffer, the data can be obtained as the segmentation data corresponding to the first check data.

In S14, the method includes determining whether the first check data is a first type or a second type.

In this embodiment, a data type identifier associated with the first check data may be configured in the mapping table. In this case, it may be determined whether the first check data is the first type or the second type according to the data type identifier. For example, when Type=1, the first check data is the first type. When Type=0, the first check data is the second type. In other embodiments, the values of Type may be interchangeable, that is, when Type=0, the first check data is the first type, and when Type=1, the first check data is the second type. The data type identifier may also be other forms, which is not limited herein.

In another embodiment, the first check data of the first type and the first check data of the second type may be separately stored in different mapping tables, so as to facilitate system access, and it may be determined whether the first check data is the first type or the second type according to the mapping table from which the first check data is derived.

In S15, the method includes determining whether the segmentation data is a repeated permutation of the first check data if the first check data is the first type, and if not a repeated permutation of the first check data a security error exists in the system start-up file.

According to the determination result of the above block S14, when the first check data is the first type, the method includes detecting whether the segmentation data is a repeated permutation of the first check data, if not the repeated permutation of the first check data, it is indicated that the current system firmware has been modified or damaged, the user is promoted for further processing. If the segmentation data is a repeated permutation of the first check data, it is indicated that the segmentation data has not been modified or damaged. For example, if the first check data is: V=0xA5, and it may be compared whether the segmentation data is a repeated permutation of "A5".

In S16, the method includes: if the first check data is the second type, determining whether second check data, acquired through calculating the segmentation data according to a check algorithm, is consistent with the first check data, and if the second check data is inconsistent with the first check data, then a security error exists in the system start-up file.

According to the determination result of block S14, when the first check data is the second type, the segmentation data is calculated with the check algorithm to obtain the second check data, and the second check data is compared with the first check data. If the comparison result is that these data are different, it means that the current system firmware has been modified or damaged, and the user is promoted for further processing. If the comparison result is that these data are the same, it means that the segmentation data is not modified or damaged. The above check algorithm may be a HASH algorithm or other public algorithms.

Alternatively, in other embodiments, when the data type identifier and the corresponding first check data are stored in the same mapping table, the first check data of the first type and the first check data of the second type may be continuously stored separately, and the first check data of the first type is configured to be read prior to the first check data of the second type. Since the check time of the segmentation data corresponding to the first check data of the first type is less than the check time of the segmentation data corresponding to the first check data of the second type, when the segmentation data corresponding to the first check data of the first type is modified or damaged, the error prompt can be quickly generated, which greatly reduces the time for system firmware verification.

In the above method, during the check process, different types of segmentation data are checked according to different methods, thereby reducing the verification time of the system start-up file and improving work efficiency.

In a specific implementation, the system firmware file is stored in the system firmware partition. Since the length of the system firmware file is generally smaller than the length of the system firmware partition, in order to keep the length of the system firmware file consistent with the length of the system firmware partition during the storage process, a large amount of padding data, mostly hexadecimal, needs to be stored in the system firmware partition. The padding data is often a repeated permutation of bytes or byte combinations, and then the bytes or byte combination are directly regarded as the first check data, and defined as the first type, for example: Type=1, while the HASH value of system firmware data or other check data is configured as the first check data and defined as the second type, for example: Type=0. Therefore, the above data is distinguished and checked, which can reduce the check time and improve the work efficiency. Similarly, the repeated permutation of the bytes or byte combinations inside the system firmware data can be directly regarded as the first check data of the first type and get checked.

Figure 2:
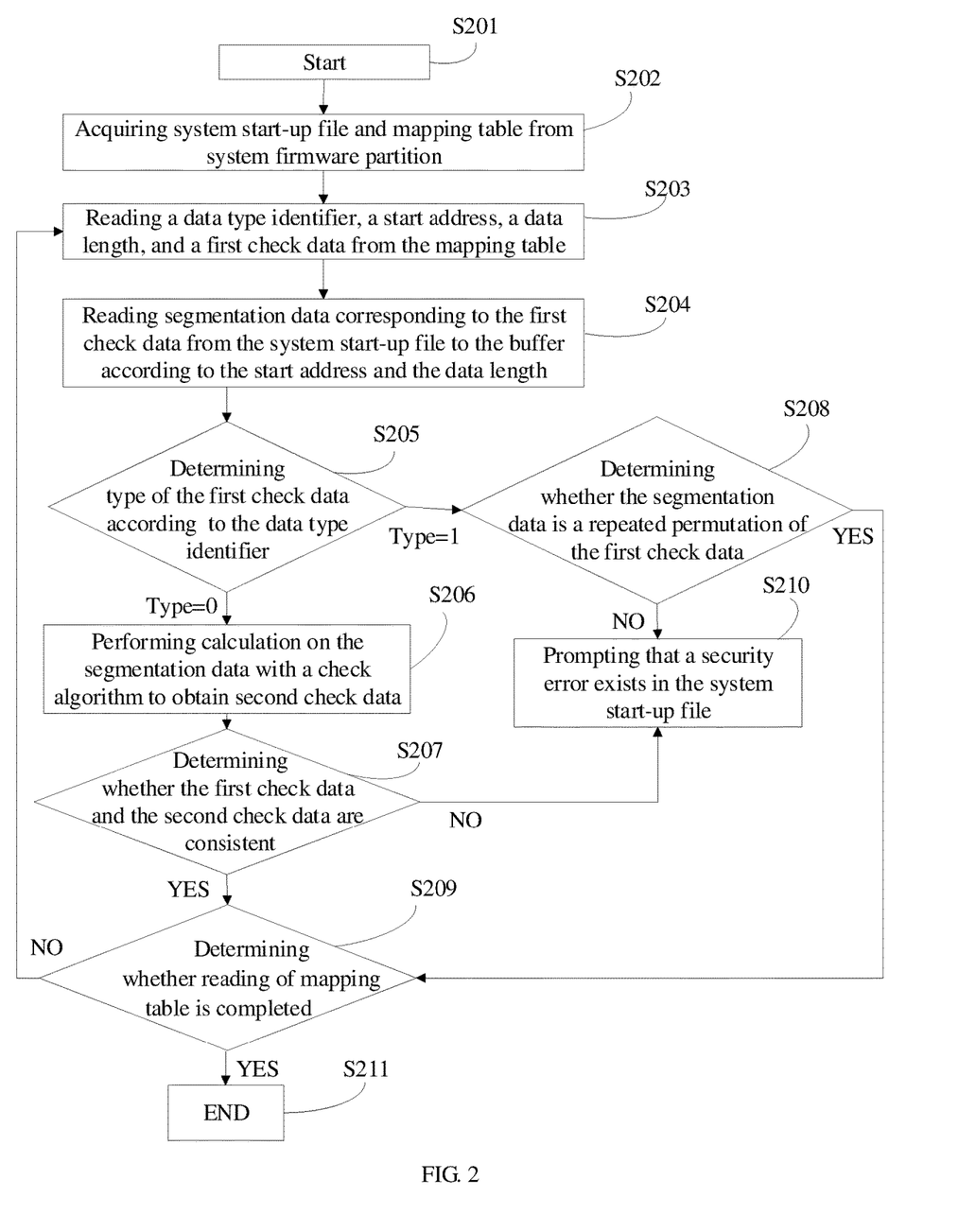
FIG. 2 is a schematic flow chart illustrating another embodiment of a checking method of a system start-up file according to the present disclosure.

Referring to FIG. 2, FIG. 2 is a schematic flow chart illustrating another embodiment of a checking method of a system start-up file according to the present disclosure. In this embodiment, the method for checking the system start-up file includes the following blocks.

In S201, the method starts.

In S202, the method includes acquiring a system start-up file and a mapping table from a system firmware partition.

In S203, the method includes reading a data type identifier, a starting address, a data length, and a first check data from the mapping table.

In S204, the method includes reading segmentation data corresponding to the first check data from the system start-up file to the buffer, according to the starting address and the data length.

In S205, the method includes determining a type of the first check data according to the data type identifier. When Type=0, block S206 is executed, and when Type=1, block S208 is executed.

In S206, the method includes performing calculation on the segmentation data with a check algorithm to obtain second check data.

In S207, the method includes determining whether the first check data and the second check data are consistent. If the result is that they are consistent, block S209 is executed, and if the result is that they are inconsistent, block S210 is executed, and the process ends.

In S208, the method includes determining whether the segmentation data is a repeated permutation of the first check data. If the result is that they are the same, block S209 is executed, and if the result is that they are different, block S210 is executed, and the process ends.

In S209, the method includes determining whether reading of the mapping is completed or not. If the reading is completed, block S211 is executed, and if the reading is not completed, the process returns to block S203.

In S210, the method includes prompting that a security error exists in the system start-up file.

In S211, the method ends.

Following examples are made for further illustration. When the system is started, the system start-up file and the mapping table are acquired from the system firmware partition, and the data type identifier (Type), the first check data (Value), the starting address (Address) and the data length (Length) are read from the mapping table.

Block 1. When Type=1, Address=4096, Length=90, and Value=0xA5, starting from the system start-up file address 4096, reading data with a length of 90 to the buffer, due to the read data is Type=1, it is compared that whether the segmentation data of the buffer is a repeated permutation of A5. If it is not a repeated permutation of A5, it will prompt that the system start-up file have a security error, or if it is a repeated permutation of A5, it is further determined whether the segmentation data has been modified or damaged or not, and the process continues to read the contents of the mapping table.

Block 2. When Type=0, Address=0, Length=4096, and Value=V1, starting from the system start-up file address 0, reading data with a length of 4096 to the buffer, as the read data is a type of Type=0, the segmentation data of the buffer is calculated with a HASH algorithm to obtain second check data V2, and the first check data V1 is compared with the second check data V2. If V1≠V2, it is promoted that the system start-up file has a security error. If V1=V2, it is determined that the segmentation data is not modified or damaged, and the process continues to read the contents of the mapping table.

The above two blocks are repeated until the mapping table reading is completed. Through the above method, the check of the system start-up file can be completed quickly.

Figure 3:
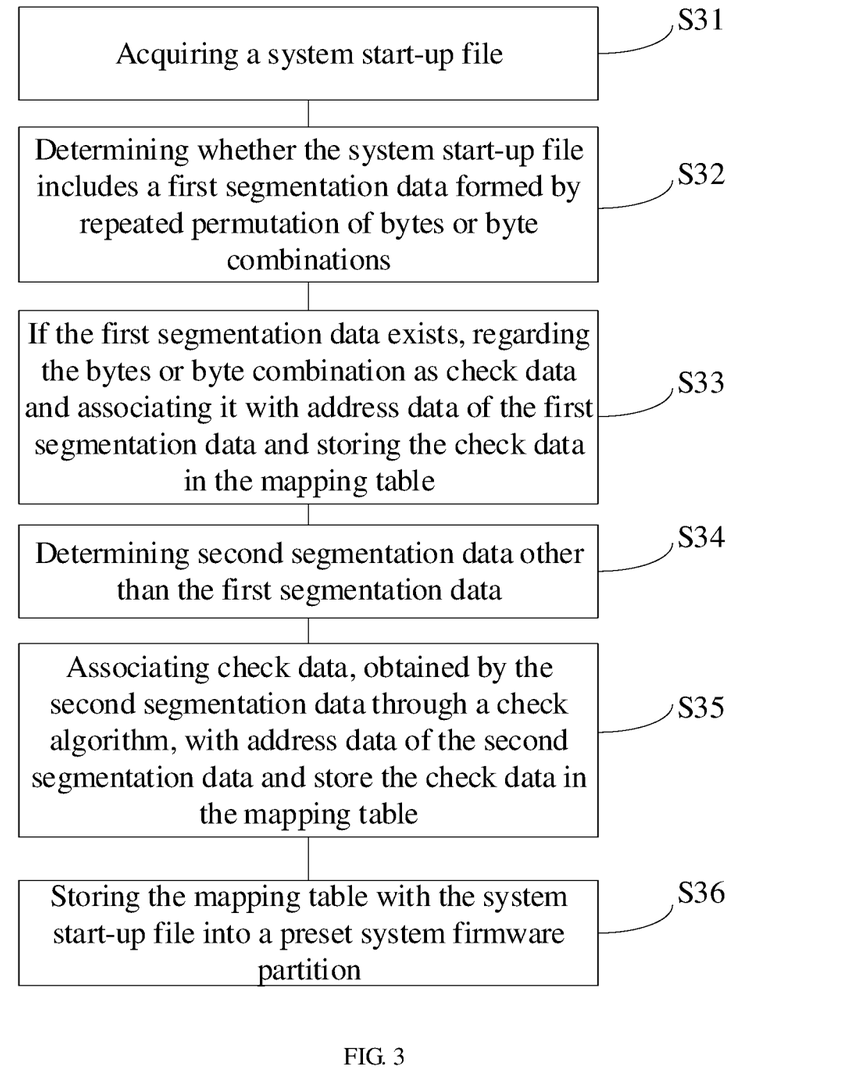
FIG. 3 is a schematic flow chart illustrating an embodiment of a compiling method for a system start-up file according to the present disclosure.

FIG. 3 is a schematic flow chart of an embodiment of a compiling method of a system start-up file according to the present disclosure. The compiling method includes the following blocks.

In S31, the method includes acquiring a system start-up file.

Herein, the system start-up file is a system firmware file for installation.

In S32, the method includes determining whether the system start-up file includes a first segmentation data formed by a repeated permutation of bytes or byte combinations.

Since the system firmware file contains a large amount of padding data formed by a repeated permutation of in bytes or byte combinations, it can be compared in a single byte, 4 bytes or 8 bytes during compiling process. The data formed by repeated permutation of bytes or byte combinations is regarded as the first segmentation data.

In S33, the method includes: if the first segmentation data exists, regarding the bytes or byte combination as the check data and associating it with the addressing data of the first segmentation data and storing it in the mapping table.

The above repeated bytes or byte combinations are directly used as the first check data, and defined as a first type, get associated with the addressing data of the first segmentation data and stored in the mapping table.

In S34, the method includes determining second segmentation data other than the first segmentation data.

In S35, the method includes associating the check data, obtained by the second segmentation data through the check algorithm, with the addressing data of the second segmentation data and storing the data in the mapping table.

Herein, the check algorithm is a HASH algorithm, and the HASH value or other check data of the system firmware data is used as the first check data, defined as the second type, and is associated with the addressing data of the second segmentation data to get stored in the mapping table.

In S36, the method includes storing the mapping table together with the system start-up file into a preset system firmware partition.

Alternatively, the data type identifier associated with the check data, is configured to separately mark the check data, obtained by the bytes or byte combination, and the check data, obtained through the check algorithm, into the first type and the second type, or the check data obtained by the bytes or byte combinations and the check data obtained by the check algorithm are separately stored in different mapping tables.

Alternatively, the check data obtained by the bytes or byte combination and the check data obtained by the check algorithm are separately stored continuously, and the check data obtained by the bytes or byte combination is configured to be read prior to the check data obtained by the check algorithm. Since the check time of the first type of segmentation data is less than the check time of the second type of segmentation data, when the padding data in the system firmware file is modified or damaged, the time for system firmware check is greatly reduced.

Figure 4:
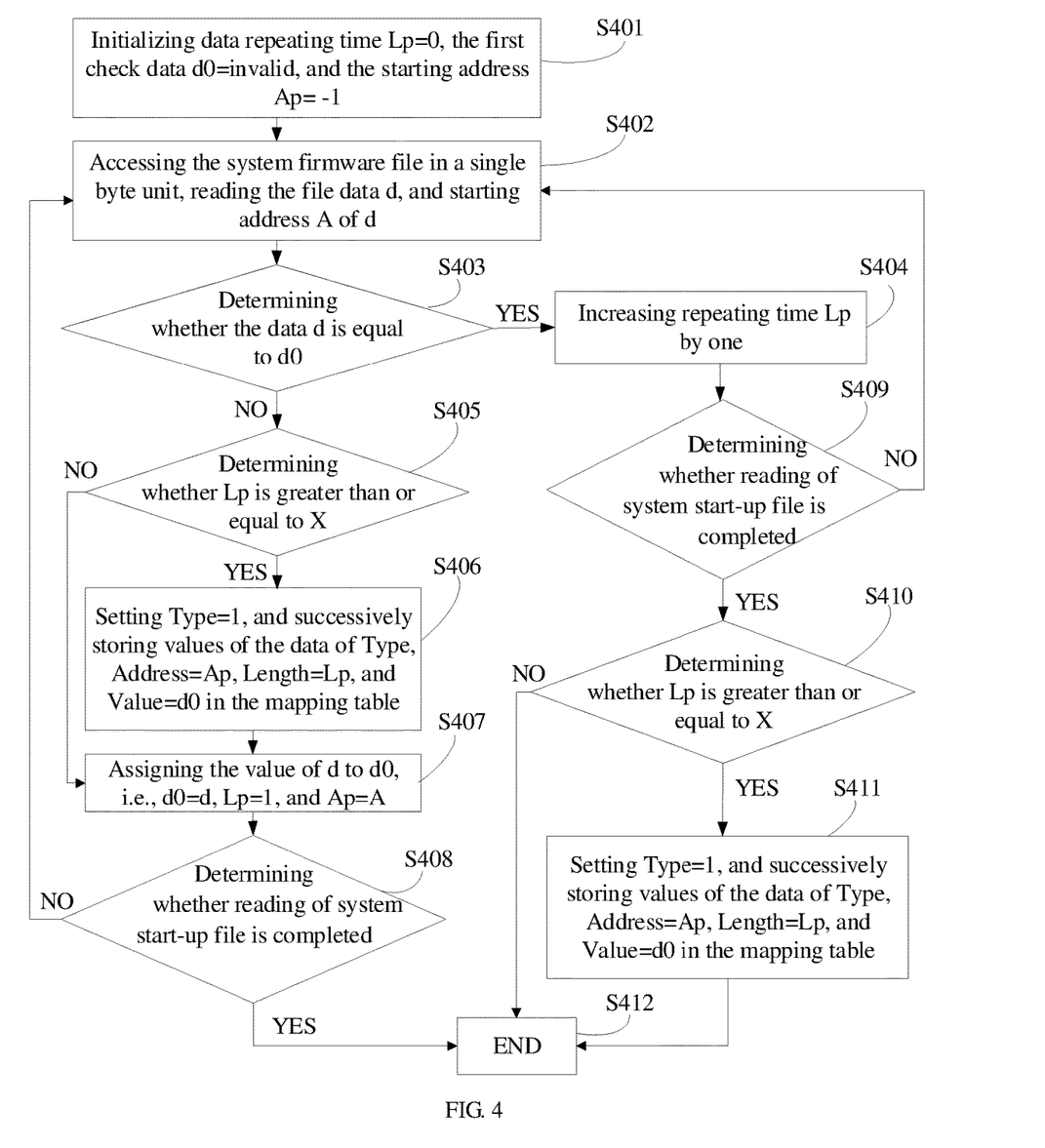
FIG. 4 is a schematic flow chart illustrating another embodiment of a compiling method for a system start-up file according to the present disclosure.

Referring to FIG. 4, FIG. 4 is a schematic flow chart illustrating another embodiment of a compiling method of a system start-up file according to the present disclosure. Taking a single byte as an example, the searching process of the first segmentation data includes the following blocks.

In S401, the method includes initializing data repeating time Lp=0, first check data d0=invalid, and the starting address Ap=−1.

In S402, the method includes accessing the system firmware file in a single byte, reading the file data d, and starting address A of d.

In S403, the method includes determining whether the data d is equal to d0. If d=d0, block S404 is executed, and if d1≠d0, block S405 is executed.

In S404, the method includes increasing the repeating time Lp by one, and block S409 is further executed.

In S405, the method includes determining whether Lp is greater than or equal to X. If Lp≥X, block S406 is executed, and if Lp<X, block S407 is executed.

In S406, the method includes setting Type=1, and successively storing the data values of Type, Address=Ap, Length=Lp, and Value=d0 in the mapping table.

In S407, the method includes assigning the value of d to d0, i.e., d0=d, Lp=1, and Ap=A, and further executing block 408.

In S408, the method includes determining whether the system start-up file reading is completed. If the reading is not completed, the process returns to block S402. If the file reading is completed, block S412 is executed.

In S409, the method includes determining whether or not the system start-up file reading is completed. If the reading is not completed, the process returns to block S402. If the file reading is completed, block S410 is executed.

In S410, the method includes determining whether Lp is greater than or equal to X. If Lp≥X, block S411 is executed, and if Lp<X, block S412 is executed.

In S411, the method includes setting Type=1, and successively storing the data values of Type, Address=Ap, Length=Lp, and Value=d0 in the mapping table.

In S412, the method ends.

In this embodiment, taking a single byte as an example, in a specific implementation, the system may select the same data of multiple bytes according to different platforms, for example, a 32-bit CPU platform can select the same data of 4 bytes, so as to effectively speed up the process by the CPU data width. Similarly, for a 64-bit CPU, the same data with 8 bytes can be used, which is not limited herein.

In other embodiments, the second segmentation data may be searched according to the searching process of the first segmentation data described above. When d1≠d0, or Lp<X, the Type is set to 0, and the data values of Type, Address=Ap, Length=Lp, Value=d0 are sequentially added to the mapping table and stored as the information of the second segmentation data. The data other than the first segmentation data may also be configured as the second segmentation data by using a difference algorithm, and details are not described herein.

Figure 5:
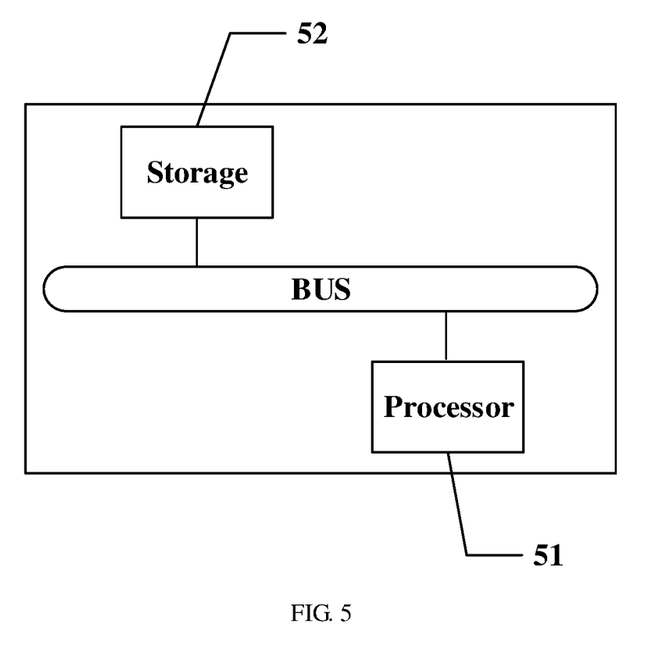
FIG. 5 is a schematic structural diagram illustrating an embodiment of a check system for a system start-up file according to the present disclosure.

FIG. 5 is a block diagram illustrating an embodiment of a check system of a system start-up file according to the present disclosure. The system includes a processor 51 and a storage 52 coupled to the processor 51.

In the embodiment, the storage 52 is configured to store a system firmware file, a mapping table, and instructions executed by the processor 51, and the like.

Herein the mapping table includes first check data and addressing data associated with the first check data. The addressing data includes a starting address and a data length, corresponding to the segmentation data.

Herein, the mapping table is provided with a data type identifier associated with the first check data, or the first check data of the first type and the first check data of the second type are separately stored in different mapping tables.

Herein, the first check data of the first type and the first check data of the second type are separately stored continuously, and the first check data of the first type is set to be read prior to the first check data of the second type.

The processor 51 is configured to: acquire a system start-up file and a mapping table from the system firmware partition; read the first check data and the addressing data associated with the first check data from the mapping table; read the segmentation data corresponding to the first check data from the system start-up file; and determine whether the first check data is the first type or the second type. If the first check data is the first type, it is determined whether the segmentation data is a repeated permutation of the first check data, and if it is not the repeated permutation of the first check data a security error exists in the system start-up file. If the first check data is the second type, it is determined whether second check data, acquired through calculating the segmentation data according to a check algorithm, is consistent with the first check data, and if it is inconsistent with the first check data, then a security error exists in the system start-up file.

Alternatively, the processor 51 is configured to determine whether the first check data is the first type or the second type, according to the data type identifier or the mapping table from which the first check data is derived.

Herein, the check algorithm is a HASH algorithm.

In the above solution, by dividing the system firmware file into segmentation data of the first type and of the second type, during the check process, different types of segmentation data are checked according to different methods, thereby reducing verifying time of system start-up file, further improving work efficiency.

In the several embodiments provided by the present disclosure, it should be understood that the disclosed methods and systems may be implemented in other manners. For example, various functional units described herein may be integrated into one processing unit or may be present as a number of physically separated units, and two or more units may be integrated into one. The integrated units may be implemented by hardware or as software functional units. Meanwhile, the division of modules or units is performed solely based on logic functions, thus in actual implementations there may be other division methods, e.g., multiple units or components may be combined or integrated onto another system, or some features may be ignored or simply not executed. In addition, mutual couplings, direct couplings, or communications connections as displayed or discussed may be achieved through some interfaces, devices, or units, and may be achieved electrically, mechanically, or in other forms.

The above description merely illustrates some exemplary embodiments of the disclosure, which however are not intended to limit the scope of the disclosure to these specific embodiments. Any equivalent structural or flow modifications or transformations made to the disclosure, or any direct or indirect applications of the disclosure on any other related fields, shall all fall in the scope of the disclosure.

The invention claimed is:

1. A checking system of a system start-up file, comprising a processor, and a memory coupled to the processor; wherein:
    the memory is configured to store a system start-up file, a mapping table, and an instruction executed by the processor;
    the processor is configured to:
        acquire the system start-up file and the mapping table from a system firmware partition;
        read first check data and addressing data associated with the first check data from the mapping table;
        read segmentation data corresponding to the first check data from the system start-up file according to the addressing data;
        determine whether the first check data is a first type or a second type;
        determine whether the segmentation data is a repeated permutation of the first check data when the first check data is the first type, and when the segmentation data is not the repeated permutation of the first check data a security error exists in the system start-up file; and
        determine whether second check data, acquired through calculating the segmentation data according to a check algorithm, is consistent with the first check data when the first check data is the second type, and when the second check data is inconsistent with the first check data a security error exists in the system start-up file.

2. The system according to claim 1, wherein the mapping table is provided with a data type identifier associated with the first check data, or the first check data of the first type and the first check data of the second type are separately stored in different mapping tables; and
    the processor is further configured to determine whether the first check data is the first type or the second type, according to the data type identifier or the mapping table from which the first check data is derived.

3. The system according to claim 1, wherein the memory is further configured to continuously store the first check data of the first type and the first check data of the second type, and to set the first check data of the first type to get read prior to the first check data of the second type.

4. The system according to claim 1, wherein the addressing data comprises a starting address and a data length corresponding to the segmentation data.

5. The system according to claim 1, wherein the check algorithm is a HASH algorithm.

* * * * *